US010177464B2

(12) United States Patent
Moosbrugger et al.

(10) Patent No.: US 10,177,464 B2
(45) Date of Patent: Jan. 8, 2019

(54) COMMUNICATIONS ANTENNA WITH DUAL POLARIZATION

(71) Applicant: Ball Aerospace & Technologies Corp., Boulder, CO (US)

(72) Inventors: Peter J Moosbrugger, Lafayette, CO (US); Andrew M. Shroyer, Denver, CO (US)

(73) Assignee: BALL AEROSPACE & TECHNOLOGIES CORP., Boulder, CO (US)

( * ) Notice: Subject to any disclaimer, the term of this patent is extended or adjusted under 35 U.S.C. 154(b) by 0 days.

(21) Appl. No.: 15/593,927

(22) Filed: May 12, 2017

(65) Prior Publication Data

US 2017/0338571 A1    Nov. 23, 2017

Related U.S. Application Data

(60) Provisional application No. 62/338,002, filed on May 18, 2016.

(51) Int. Cl.
*H01Q 19/00* (2006.01)
*H01Q 25/00* (2006.01)
*H01Q 21/24* (2006.01)

(52) U.S. Cl.
CPC .......... *H01Q 25/001* (2013.01); *H01Q 21/24* (2013.01)

(58) Field of Classification Search
CPC ....... H01Q 25/001; H01Q 21/24; H01Q 19/00
(Continued)

(56) References Cited

U.S. PATENT DOCUMENTS

| 4,127,857 A | 11/1978 | Capps et al. |
| 4,324,034 A | 7/1982 | Monser |

(Continued)

FOREIGN PATENT DOCUMENTS

| CA | 2630301 | 6/2007 |
| WO | WO 00/64008 | 10/2000 |
| WO | WO 2017/086855 | 5/2017 |

OTHER PUBLICATIONS

International Search Report and Written Opinion for International (PCT) Patent Application No. PCT/US17/33013, dated Aug. 11, 2017, 9 pages.

(Continued)

*Primary Examiner* — Huedung X Mancuso
(74) *Attorney, Agent, or Firm* — Sheridan Ross P.C.

(57) ABSTRACT

Antenna systems and methods providing dual polarization are provided. The system includes one or more antenna elements, with each antenna element having feed points on adjacent sides. A first of the feed points is associated with a first one of a transmitted or received signal, while a second one of the feed points is associated with a second one of a transmitted or received signal. The sides of the rectangular driven element can feature different lengths, to provide transmit and receive bands that are separated from one another in frequency. A polarizer is disposed between the antenna elements and free space. Linearly polarized signals from the antenna elements are transformed into circularly polarized signals by the polarizer. Circularly polarized signals received at the antenna system are transformed into linearly polarized signals before they are passed to the antenna elements. An antenna system as disclosed herein can include a plurality of antenna elements arranged in an array.

17 Claims, 10 Drawing Sheets

(58) Field of Classification Search
USPC .......................................................... 343/756
See application file for complete search history.

(56) References Cited

U.S. PATENT DOCUMENTS

| | | | |
|---|---|---|---|
| 4,464,663 A | 8/1984 | Lalezari et al. | |
| 4,763,131 A | 8/1988 | Rosser et al. | |
| 5,086,301 A | 2/1992 | English et al. | |
| 5,086,304 A | 2/1992 | Collins | |
| 5,157,257 A | 10/1992 | Geiger | |
| 5,309,165 A | 5/1994 | Segal et al. | |
| 5,488,380 A | 1/1996 | Harvey et al. | |
| 5,515,057 A | 5/1996 | Lennen et al. | |
| 5,519,408 A | 5/1996 | Schnetzer | |
| 5,793,330 A | 8/1998 | Gans et al. | |
| 5,815,121 A | 9/1998 | Collier | |
| 5,949,382 A | 9/1999 | Quan | |
| 6,054,967 A | 4/2000 | Wu et al. | |
| 6,075,493 A | 6/2000 | Sugawara et al. | |
| 6,111,544 A | 8/2000 | Dakeya et al. | |
| 6,184,828 B1* | 2/2001 | Shoki ...................... | H01Q 3/26 342/372 |
| 6,252,556 B1 | 6/2001 | Ito et al. | |
| 6,351,239 B1 | 2/2002 | Mizuno et al. | |
| 6,480,167 B2 | 11/2002 | Matthews | |
| 6,552,691 B2 | 4/2003 | Mohuchy et al. | |
| 6,556,169 B1 | 4/2003 | Fukuura et al. | |
| 6,791,497 B2 | 9/2004 | Winebrand et al. | |
| 6,795,020 B2 | 9/2004 | Sreenivas et al. | |
| 6,822,622 B2 | 11/2004 | Crawford et al. | |
| 6,822,742 B1 | 11/2004 | Kalayeh et al. | |
| 6,900,770 B2 | 5/2005 | Apostolos | |
| 7,027,924 B2 | 4/2006 | Spoonhower et al. | |
| 7,057,570 B2 | 6/2006 | Irion, II et al. | |
| 7,075,653 B1 | 7/2006 | Rutherford | |
| 7,109,939 B2 | 9/2006 | Lynch et al. | |
| 7,265,719 B1 | 9/2007 | Moosbrugger et al. | |
| 7,405,698 B2 | 7/2008 | de Rochemont | |
| 7,411,196 B2 | 8/2008 | Kalayeh | |
| 7,492,325 B1 | 2/2009 | Moosbrugger et al. | |
| 7,817,097 B2 | 10/2010 | Margomenos | |
| 8,013,303 B2 | 9/2011 | Ershov et al. | |
| 8,102,330 B1 | 1/2012 | Albers | |
| 8,339,326 B2 | 12/2012 | Guler et al. | |
| 8,447,385 B2 | 5/2013 | Sterzer et al. | |
| 8,487,823 B2 | 7/2013 | Quan et al. | |
| 8,736,505 B2 | 5/2014 | Lambert et al. | |
| 9,001,879 B2 | 4/2015 | Maltsev et al. | |
| 9,001,917 B2 | 4/2015 | Tzanidis et al. | |
| 9,077,083 B1 | 7/2015 | Freeman et al. | |
| 9,343,817 B2 | 5/2016 | Pan | |
| 9,531,450 B2 | 12/2016 | Maltsev et al. | |
| 9,584,231 B2 | 2/2017 | Xu et al. | |
| 9,660,345 B1 | 5/2017 | Gu et al. | |
| 2002/0118140 A1* | 8/2002 | Ogawa .................... | H01Q 9/30 343/834 |
| 2004/0263852 A1 | 12/2004 | Degtiarev et al. | |
| 2005/0104791 A1 | 5/2005 | Sun et al. | |
| 2005/0206568 A1 | 9/2005 | Phillips et al. | |
| 2008/0122071 A1 | 5/2008 | Tseng et al. | |
| 2010/0207840 A1 | 8/2010 | Carr | |
| 2011/0057852 A1 | 3/2011 | Holland et al. | |
| 2012/0306698 A1 | 12/2012 | Warnick et al. | |
| 2014/0072078 A1 | 3/2014 | Sergeyev et al. | |
| 2014/0145879 A1 | 5/2014 | Pan | |
| 2014/0158870 A1 | 6/2014 | DeAntonio et al. | |
| 2014/0240186 A1 | 8/2014 | Zhou et al. | |
| 2015/0035714 A1 | 2/2015 | Zhou | |
| 2015/0109181 A1 | 4/2015 | Hyde et al. | |
| 2015/0200452 A1 | 7/2015 | Oh et al. | |
| 2015/0303587 A1 | 10/2015 | Pan | |
| 2016/0149315 A1 | 5/2016 | Elsherbini et al. | |
| 2016/0218429 A1 | 7/2016 | Klemes | |
| 2016/0241348 A1 | 8/2016 | Zirwas et al. | |
| 2016/0330643 A1 | 11/2016 | Sahin et al. | |
| 2017/0033462 A1 | 2/2017 | Clemente et al. | |
| 2017/0085006 A1 | 3/2017 | Corman et al. | |
| 2017/0126304 A1 | 5/2017 | Black et al. | |
| 2017/0127295 A1 | 5/2017 | Black et al. | |

OTHER PUBLICATIONS

Fisher "Design and Performance Analysis of A 1-40GHZ Ultra-Wideband Antipodal Vivaldi Antenna," German Radar Symposium GRS, 2000, 5 pages (available at www.roke.co.uk/resources/papers/analysis-of-a-Ultra-wideband-Antipodal-Vivaldi-Antenna.pdf).

Hojjat et al., "Design and Analysis of New Fermi-like Tapered Slot Antennas," IEEE Antennas and Propagation Society International Symposium, 2000, vol. 3, pp. 1616-1619.

Holter, "Element for wideband and very wide-angle phased arrays," IEEE Antennas and Propagation Society International Symposium, 2001, vol. 2, pp. 440-443.

Stasiowski "Broadband Array Antenna," Cobham, available at www.cobham.com/media/83841/Broadband%20Array%20Antenna.pdf, Feb. 20, 2012, 18 pages.

Wang et al. "Design of a Compact Tapered Slot Vivaldi Antenna Array for See Through Concrete Wall UWB Applications," Proceedings of the Union of Radio Science, XXIX General Assembly, Aug. 7-16, 2008, Chicago, USA, 4 pages.

Weem et al. "Vivaldi Antenna Arrays for SKA," Antennas and Propagation Society International Symposium, 2000, 4 pages, (available at www.ecee.colorado.edu/microwave/docs/publications/2000/ABS_JPWbn_00.pdf).

Wu et al. "Investigation of Several Terahertz Electromagnetic Band Gap Structures," Microwave and Optical Technology Letters, vol. 52, No. 3, Dec. 2010, 9 pages.

International Search Report and Written Opinion for International (PCT) Patent Application No. PCT/US2013/026770 dated May 3, 2013. 12 pages.

International Preliminary Report on Patentability for International (PCT) Patent Application No. PCT/US2013/026770, dated Sep. 4, 2014, 6 pages.

Official Action for U.S. Appl. No. 13/401,600 dated Oct. 1, 2013, 6 pages.

Notice of Allowance for U.S. Appl. No. 13/401,600 dated Jan. 17, 2014, 7 pages.

Official Action for U.S. Appl. No. 13/564,501, dated Dec. 15, 2014 17 pages.

Notice of Allowance for U.S. Appl. No. 13/564,501, dated Apr. 2, 2015 8 pages.

* cited by examiner

COMMUNICATIONS ANTENNA WITH DUAL POLARIZATION

CROSS-REFERENCE TO RELATED APPLICATIONS

This application claims the benefit of U.S. Provisional Patent Application Ser. No. 62/338,002, filed May 18, 2016, the entire disclosure of which is hereby incorporated herein by reference.

FIELD

A dual band, dual polarization antenna system is provided. More particularly, a system that includes a dual band, dual-mode radiator and a polarizer is provided.

BACKGROUND

Dual band antennas have many applications. For example, communication systems in which transmit and receive modes are separated in bandwidth are in use. As another example, communication systems often utilize polarization diversity. For instance, a system may transmit a right-hand circularly polarized signal, and receive a left-hand circularly polarized signal.

In communication systems, it is desirable to provide a system that is inexpensive to produce, simple, and efficient. However, conventional solutions to providing systems capable of providing polarization diversity have typically required the use of switches, complex printed circuit board arrangements, and hybrids or conventional mode formers, all of which introduce losses, can be relatively complex, and increase the cost of the system.

Accordingly, there is a need for a low-cost, high efficiency solution to providing a communication system with a relatively wide bandwidth and with polarization diversity capabilities.

SUMMARY

Embodiments of the present disclosure are directed to solving these and other problems and disadvantages of the prior art. In particular, methods and apparatuses for providing a relatively simple communications system that provides polarization diversity are disclosed. In accordance with embodiments of the present disclosure, the communications system includes an antenna system having a dual band, dual-mode active antenna element with a polarizer in front. The antenna element operates in connection with the transmission and reception of signals having first or second orthogonal linear polarizations. In accordance with further embodiments of the present disclosure, the signals having first or second orthogonal linear polarizations are in first and second frequency bands respectively. The polarizer operates to transform linearly polarized signals received from the antenna element to circularly polarized signals for transmission across free space. The polarizer also operates to transform circularly polarized signals received at the antenna system to linearly polarized signals before those signals are passed to the antenna element. In accordance with further embodiments of the present disclosure, the antenna system features a low profile, planar element architecture. More particularly, embodiments of an antenna system in accordance with the present disclosure feature one or more planar active elements and a planar polarizer. In addition, the antenna structure can include an array having a plurality of active elements.

As an example, but without limitation, the active element may comprise a rectangular patch antenna that is fed on first and second adjacent sides by first and second feeds respectively. In accordance with at least some embodiments, the patch can be fed on the side corresponding to the smaller dimension for low band operation, and can be fed on the side corresponding to the larger dimension for high band operation. These two modes produce orthogonal linear polarizations. A polarizer placed in front of the aperture is used to produce right-hand circular polarization (RHCP) and left-hand circular polarization (LHCP) from the two linear modes. In at least some embodiments, the feed on the side corresponding to the smaller dimension is operative to receive signals, while the feed on the side corresponding to the larger dimension is operative to transmit signals. In accordance with still other embodiments, the feed on the side corresponding to the smaller dimension is operative to transmit signals, while the feed on the side corresponding to the larger dimension is operative to receive signals. In addition, embodiments of the present disclosure can include phased array antennas or other antennas having a plurality or array of antenna elements. In accordance with alternate embodiments of the present disclosure, the antenna element may comprise a horn or other three-dimensional structure.

In accordance with at least some embodiments of the present disclosure, a dual band phased array antenna system is provided. The transmit function is provided on a first band, while the receive function is providing on a second, different band. The different bands can be relatively broad. Moreover, the transmit function can be associated with a first linear polarization at an active or radiating antenna element, while the receive function can be associated with a second linear polarization at the active or receiving antenna element. A polarizing element or structure converts transmitted signals from the first linear polarization into a first circular polarization, and converts received signals from a second circular polarization into the second linear polarization. The dual band circularly polarized features of embodiments of the present disclosure can be provided in a low profile, planar element architecture, without the need for switches or mode formers in the front-end.

In accordance with embodiments of the present disclosure, the antenna system includes a plurality of active antenna elements disposed in an array. Each individual antenna element is provided in the form of a rectangular patch that is fed from adjacent sides of the element. In particular, each feed may be separated from the other feed on a particular antenna element by about 90°. As used herein, about 90° includes from 88° to 92°. A polarizer overlays the array of active antenna elements. In particular, the polarizer is located between the array of antenna elements and free space. The polarizer is configured to convert linear signals transmitted by the antenna elements to a circular polarization, and likewise to convert signals received at the antenna system having a circular polarization into a linear polarization before those signals arrive at the antenna elements. The configuration of the antenna system thus allows antenna elements to transmit and receive signals simultaneously. In accordance with at least some embodiments of the present disclosure, each active or driven patch or antenna element may be paired with a floating or resonant patch or antenna element. For example, a resonant element may be disposed adjacent to and spaced apart from an associated antenna element.

Additional features and advantages of embodiments of the disclosed invention will become more readily apparent from the following description, particularly when taken together with the accompanying drawings.

DETAILED DESCRIPTION

Figure 1:
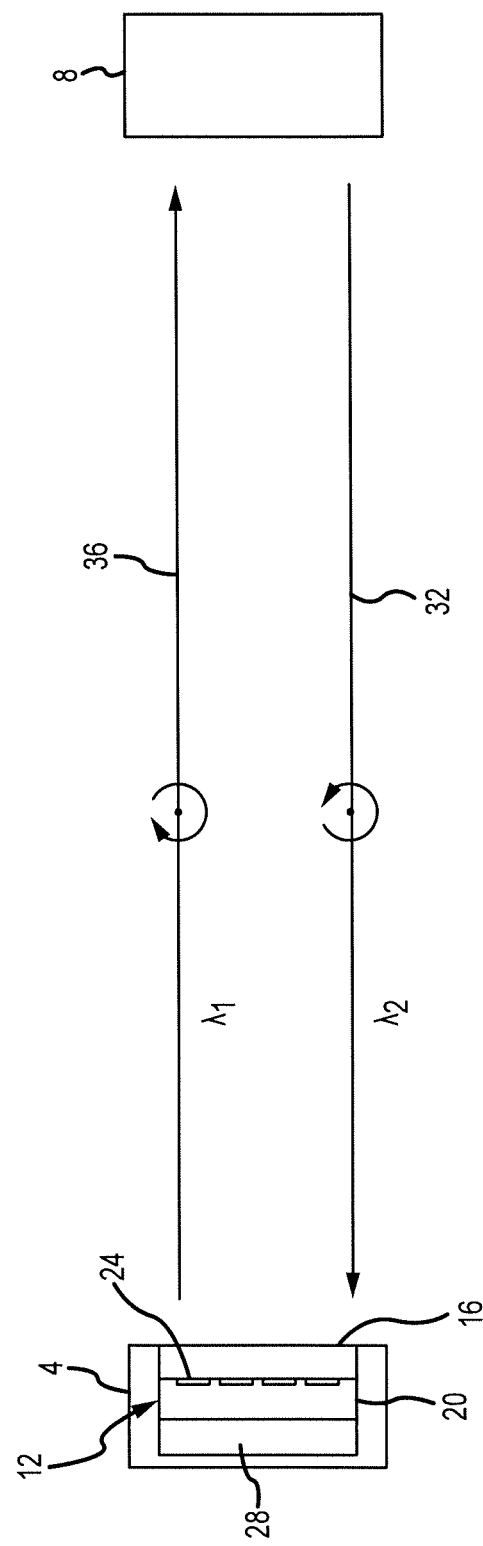
FIG. 1 depicts a communication system incorporating an antenna system in accordance with embodiments of the present disclosure.

FIG. 1 depicts a communication system 1 incorporating first 4 and second 8 endpoints, with at least the first endpoint 4 incorporating an antenna system 12 in accordance with embodiments of the present disclosure. The antenna system 12 generally includes a polarizer 16 and a radiating structure 20 that includes one or more radiating or active elements 24. The antenna system 12 can also include or can be associated with a radio frequency transceiver 28. As used herein, a transceiver can include a radio frequency signal transmitter, a radio frequency signal receiver, or both a radio frequency signal transmitter and a radio frequency receiver. In general, the first endpoint 4 operates to receive radio frequency signals 32 that have a first circular polarization, and to transmit radio frequency signals 36 that have a second circular polarization. The first and second polarizations can be opposite to one another. In addition, in accordance with at least some embodiments, the signals 32 received by the first endpoint 4 are within a first range of frequencies, and the signals 36 transmitted by the first endpoint 4 are within a second range of frequencies, where the first range of frequencies are exclusive of frequencies included in the second range of frequencies.

Figure 2:
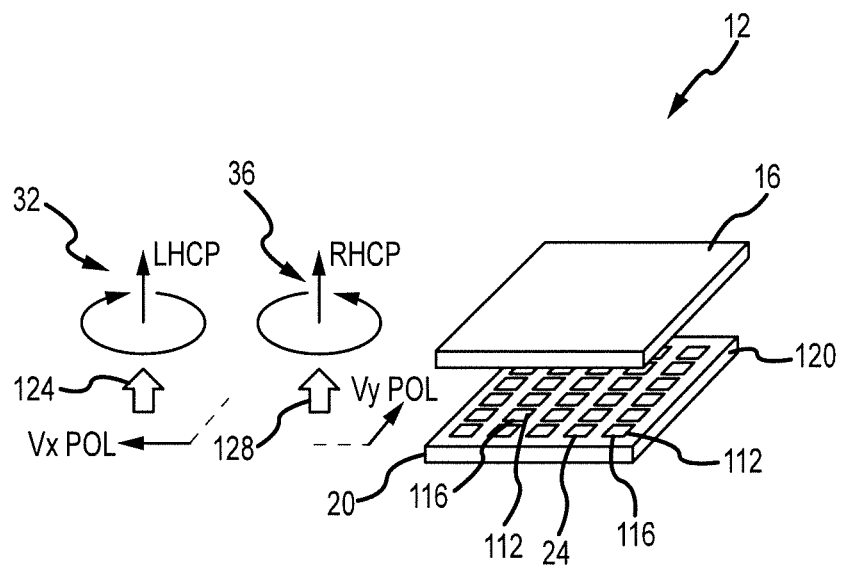
FIG. 2 is a perspective view of an antenna system in accordance with embodiments of the present disclosure.
Figure 3:
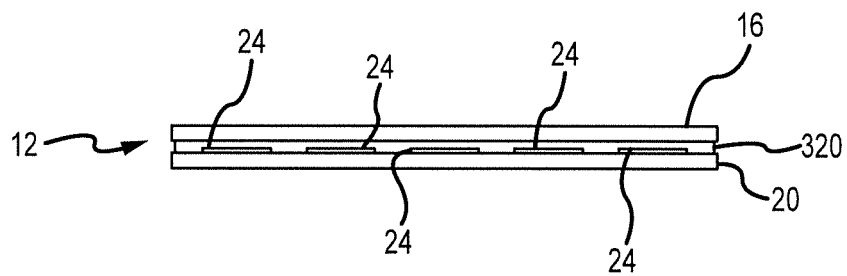
FIG. 3 is a view in elevation of the antenna system of FIG. 2.

FIG. 2 depicts an antenna system 12 in accordance with embodiments of the disclosed invention in a perspective view, and FIG. 3 depicts the antenna system 12 of FIG. 2 in a side elevation view. The antenna system 12 generally includes a radiating structure 20 having a plurality of antenna elements 24. Each antenna element 24 may comprise a conductive element or patch that is connected to first and second feeds. As can be appreciated by one of skill in the art after consideration of the present disclosure, an antenna element 24 can comprise a driven element that operates as a radiating element in a transmit mode and as a receiving element in a receive mode. Each antenna element 24 is connected to first 112 and second 116 feed points. In accordance with embodiments of the present disclosure, one of the feed points 112 and 116 is associated with a received signal 32, and the other of the feed points 112 and 116 is associated with a transmitted signal. Moreover, a single antenna element 24 can be operated in transmit and receive modes simultaneously.

The antenna elements 24 may be disposed across the radiating structure 20 in the form of a two-dimensional array, and may be supported by a substrate 120. In accordance with at least some embodiments, the antenna elements 24 and the substrate 120 may be provided as part of a printed circuit board (PCB). In addition, the radiating structure 20 may be planar. In accordance with further embodiments, feed or signal lines associated with the feed points 112 and 116 may also be provided as part of a PCB. The polarizer 16 is disposed adjacent the array of antenna elements 24, such that signals passing between the antenna elements 24 and free space pass through the polarizer 16. As shown in FIG. 3, the polarizer may be connected to the radiating structure 20 via a spacer 320 that covers the radiating elements 24.

The feed points 112 and 116 associated with any one antenna element 24 may be located on or proximate to adjacent sides of the antenna element 24 such that they are separated from one another by 90°. As a result, the first feed point 112 is associated with a signal having a first linear polarization, while the second feed point 116 is associated with a signal having a second linear polarization. As an example, and without limitation, the first feed point 112 may transmit or receive a signal 124 a horizontal linear polarization aligned with the x-axis, while the second feed point 116 may transmit or receive a signal 128 having a vertical linear polarization aligned with the y-axis. That is, the signals associated with the different feed points 112 and 116 of an antenna element 24 may have orthogonal linear polarizations. The polarizer 16 is configured to convert an incident signal having a linear polarization into a signal having a circular polarization. For example, and without limitation, the polarizer 16 can convert the signal having the horizontal linear polarization into a left-hand circularly polarized (LHCP) signal, and can convert the signal having the vertical linear polarization into a right-hand circularly polarized (RHCP) signal. Moreover, the polarizer 16 can convert an incident signal having a circular polarization into a signal having a linear polarization.

Figure 4:
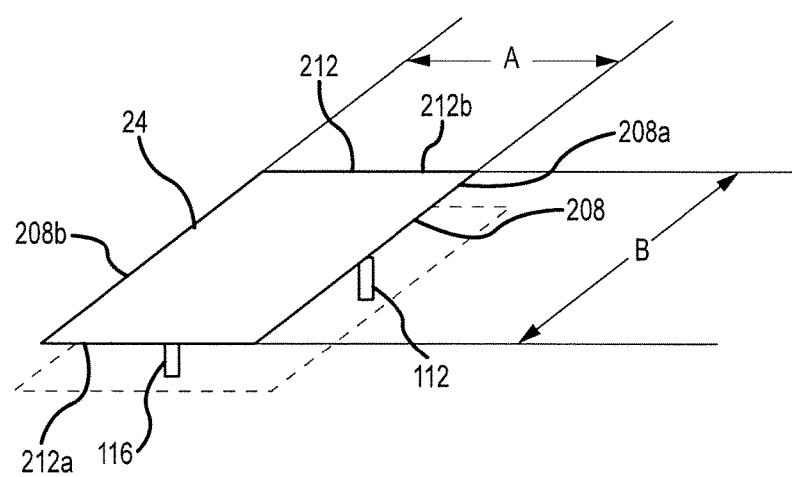
FIG. 4 is a perspective view of an antenna element of an antenna system in accordance with embodiments of the present disclosure.
Figure 5:
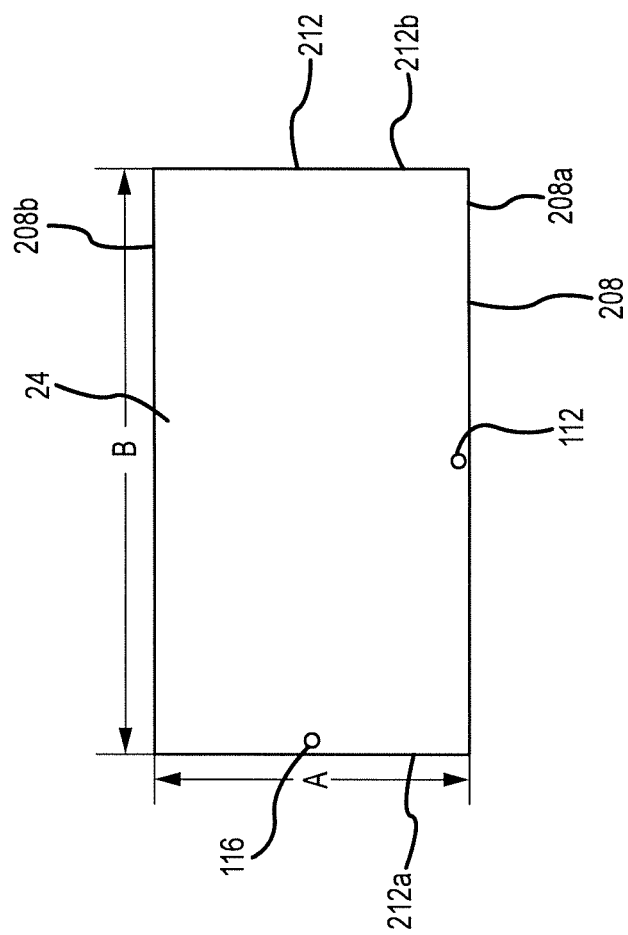
FIG. 5 is a plan view of the antenna element of FIG. 4.

FIGS. 4 and 5 are perspective and planar views respectively of an antenna element 24 and associated feed points 112 and 116 of the exemplary embodiment of the antenna system 12 illustrated in FIGS. 2-3. In this example, the antenna element 24 is a rectangular patch element having a longer side 208 and a shorter side 212. As can be appreciated by one of skill in the art after consideration of the present disclosure, a signal associated with the first feed point 112 on the longer side 208 will resonate at a higher frequency than a signal associated with the second feed point 116 on the shorter side 212. This is because the distance (A) from the side 208a proximate to the first feed point 112 to the side 208b opposite that feed point 112 is shorter than the distance (B) from the side 212a proximate to the second feed point 116 to the side 212b opposite that feed point 116. As can be appreciated by one of skill in the art, the dimensions of the antenna element 24 can be derived from the wavelengths selected for the transmit and receive bands.

Figure 6:
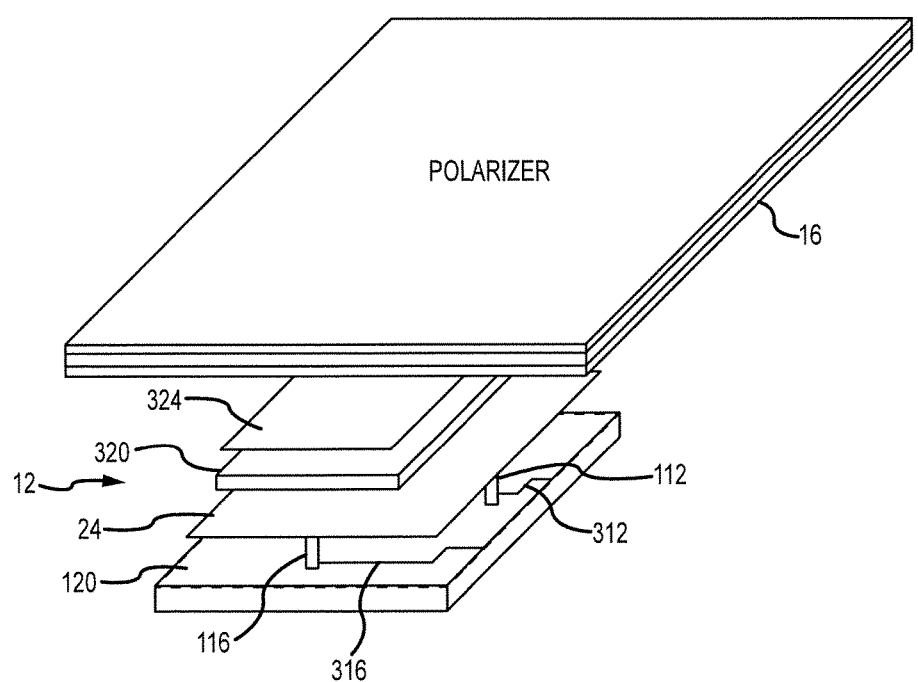
FIG. 6 is a perspective view of an antenna element and associated components of an antenna system in accordance with embodiments of the present disclosure.
Figure 7:
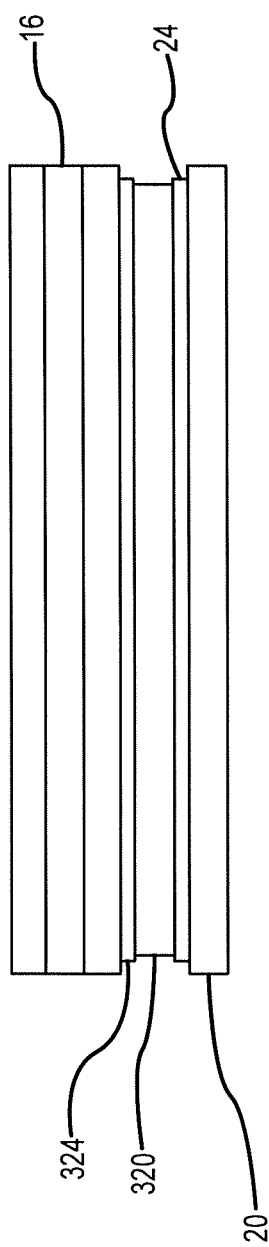
FIG. 7 is a view in elevation of the antenna element and associated components of an antenna system of FIG. 6.

FIGS. 6 and 7 are exploded perspective and side elevation views respectively of a portion of an antenna system 12 encompassing a single antenna element 24 in accordance with embodiments of the present disclosure. As shown, the antenna element 24 can include an active or driven element or patch. More particularly, the antenna element 24 can be configured as a conductive or metallic patch disposed on a supporting substrate 120. The feed points 112 and 116 can be associated with conductive feed lines 312 and 316. As can be appreciated by one of skill in the art after consideration of the present disclosure, the conductive feed lines 312 and 316 may operatively connect the respective feed points 112 and 116 to a feed network. On a side of the antenna element 24 opposite the substrate 120 is a spacer 320. In accordance with at least some embodiments, the spacer 320 is provided as a dielectric. On a side of the spacer 320 opposite the active element 108, a passive or resonant element or patch 324 may be provided. The polarizer 16 may be provided as an overlay on a side of the passive element 324 opposite the spacer 320.

The polarizer 16 may comprise an assembly that overlays the array of antenna elements 24. As an example, but without limitation, the polarizer 16 may comprise a laminated structure. More particularly, the polarizer 16 may comprise a plurality of layers of a dielectric material and etched copper features, such as Mylar with deposited copper, separated from one another by a spacer material, such as a foam. As an example, the polarizer 16 may comprise a meander line polarizer.

Figure 8A:
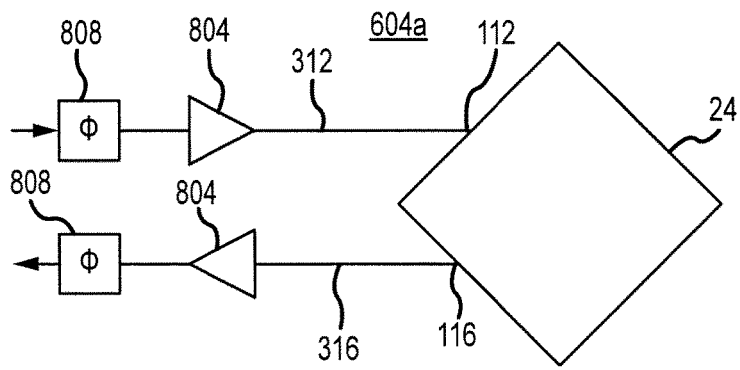
FIGS. 8A-8C depict exemplary configurations of feed networks in accordance with embodiments of the present disclosure.
Figure 8B:
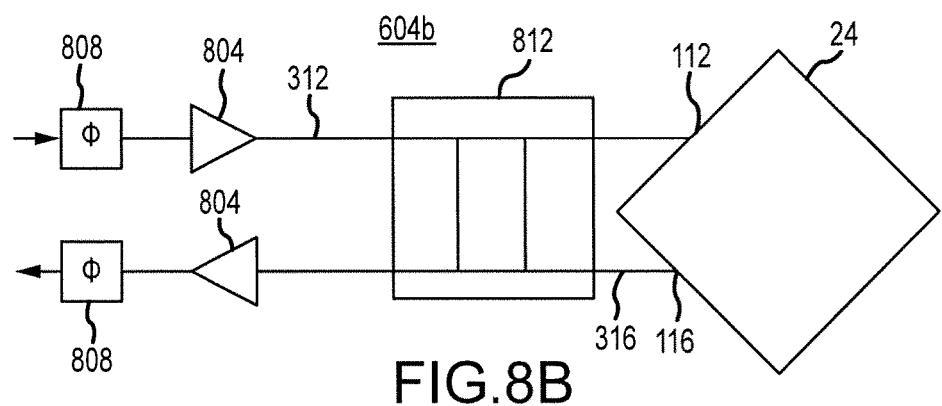
Figure 8C:
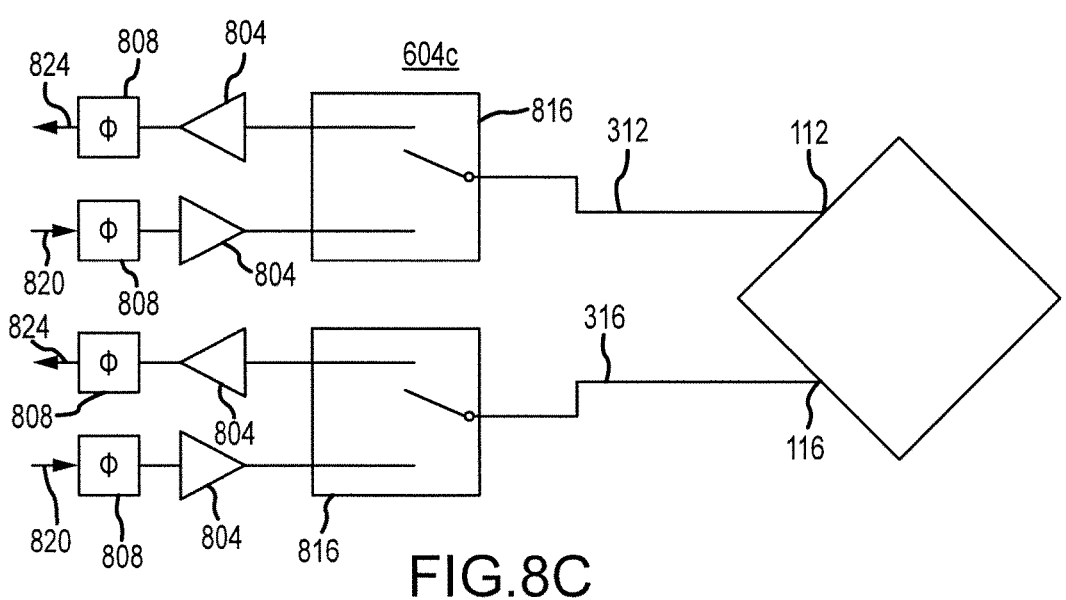

FIGS. 8A-8C depict example configurations of feed networks 604 connecting antenna elements 24 to a radio frequency transceiver 28 in accordance with embodiments of the present disclosure, and in particular illustrates components of feed networks 604 that can be duplicated for each antenna element 24 in an antenna system 12. In a first example, shown in FIG. 8A, the feed network 604a comprises feed lines 312 and 316 that are separated from one another. One of the feed lines 312 is connected to the first feed point 112 and is associated with a transmitted signal, while the other of the feed lines 316 is connected to the second feed point 116 and is associated with a received signal. The first feed line 312 is associated with a first amplifier 804 and a first phase shifter 808, and the second feed line 316 is associated with a second amplifier 804 and a second phase shifter 808.

In another example, shown in FIG. 8B, the feed network 604b includes feed lines 312 and 316 that are joined by a feed through hybrid network 812. In other aspects this second feed network 604b is configured similarly to the first example feed network 604a.

In a third example, shown in FIG. 8C, the feed network 604c includes switches 816 that permit each feed line 312 and 316 to be selectively operated in connection with either transmitted or received signals. Accordingly, each of the feed lines is associated with a transmitted signal path 820 and a received signal path 824. Each of the signal paths 820 and 824 can include an amplifier 804 and a phase shifter 808.

Figure 9:
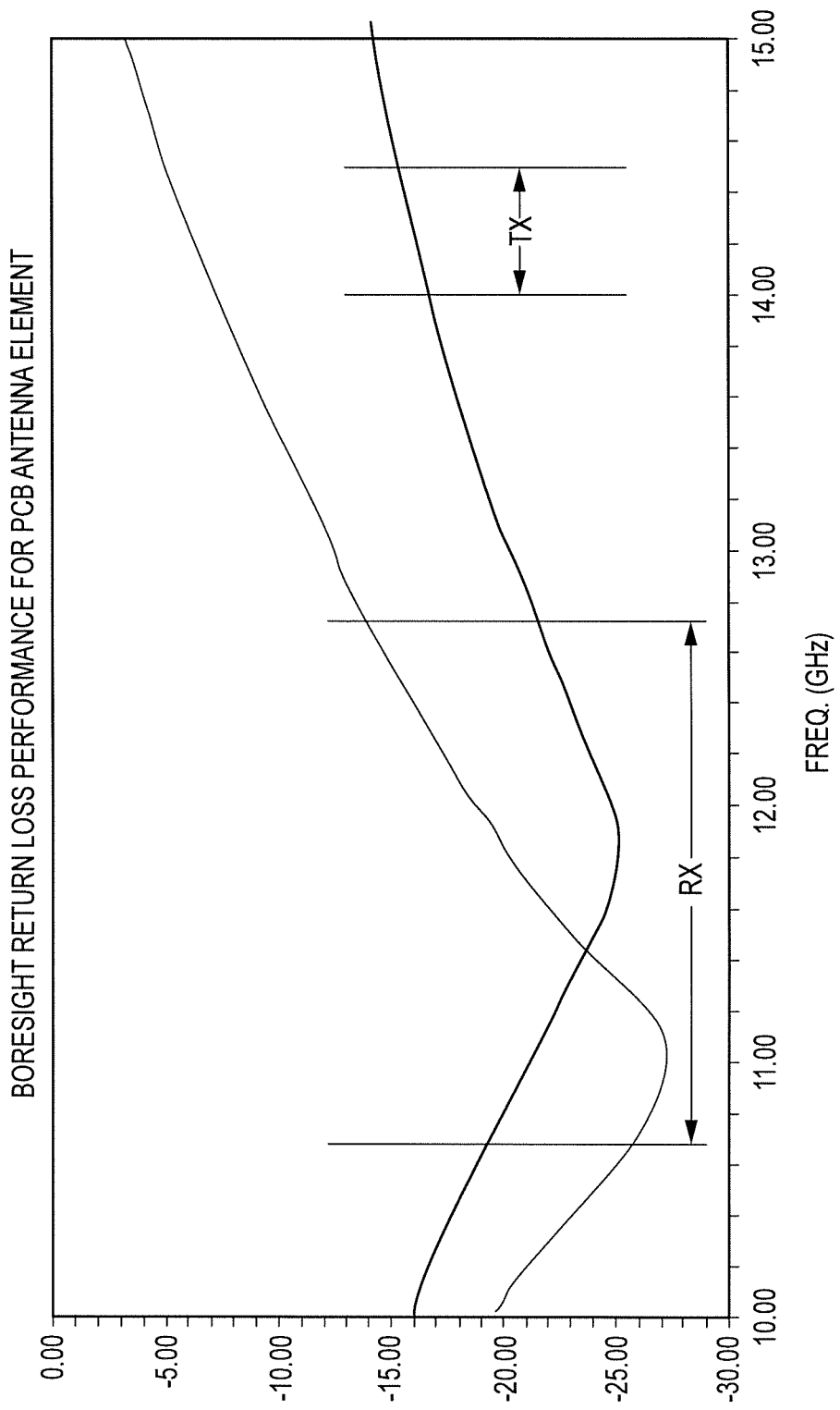
FIG. 9 is a graph depicting the performance of an exemplary antenna system in accordance with embodiments of the disclosed invention.

FIG. 9 is a graph depicting the performance of an exemplary antenna system 12 in accordance with embodiments of the disclosed invention. As shown, the transmit and receive bands are separated in frequency. In addition, the transmit and receive bands utilize polarization discrimination. For example, but without limitation, the transmit band may utilize RHCP, while the receive band may utilize LHCP.

Other characteristics of the antenna system can include relatively broad bands. The antenna system 100 can also feature relatively low loss characteristics, due to the absence of switches or mode formers in the front end. Also, the antenna system 12 can provide a low profile planar system that can be produced easily and at relatively low cost.

Figure 10:
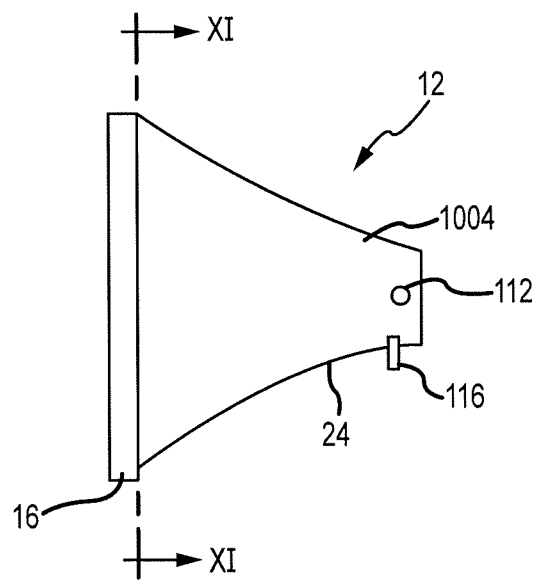
FIG. 10 is side elevation view of an antenna system in accordance with other embodiments of the present disclosure.
Figure 11:
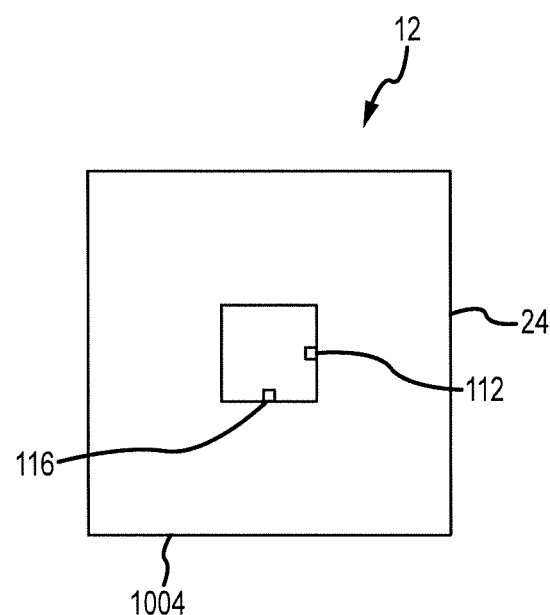
FIG. 11 is front elevation view of the antenna system of FIG. 10.

With reference now to FIG. 10, an antenna system 12 in accordance with other embodiments of the present disclosure is illustrated in a side elevation view. FIG. 11 depicts the antenna system 12 of FIG. 10 in a view taken along section line XI-XI of that figure. In this configuration, the antenna elements 24 is in the form of a horn type antenna element 1004. As in other embodiments, the feeds 112 and 116 are configured to operate in connection with orthogonal linear polarizations. Accordingly, the feeds 112 and 116 may be separated from one another by 90°. A polarizer 16 is located across the opening of the horn type antenna element 1004.

Figure 12:
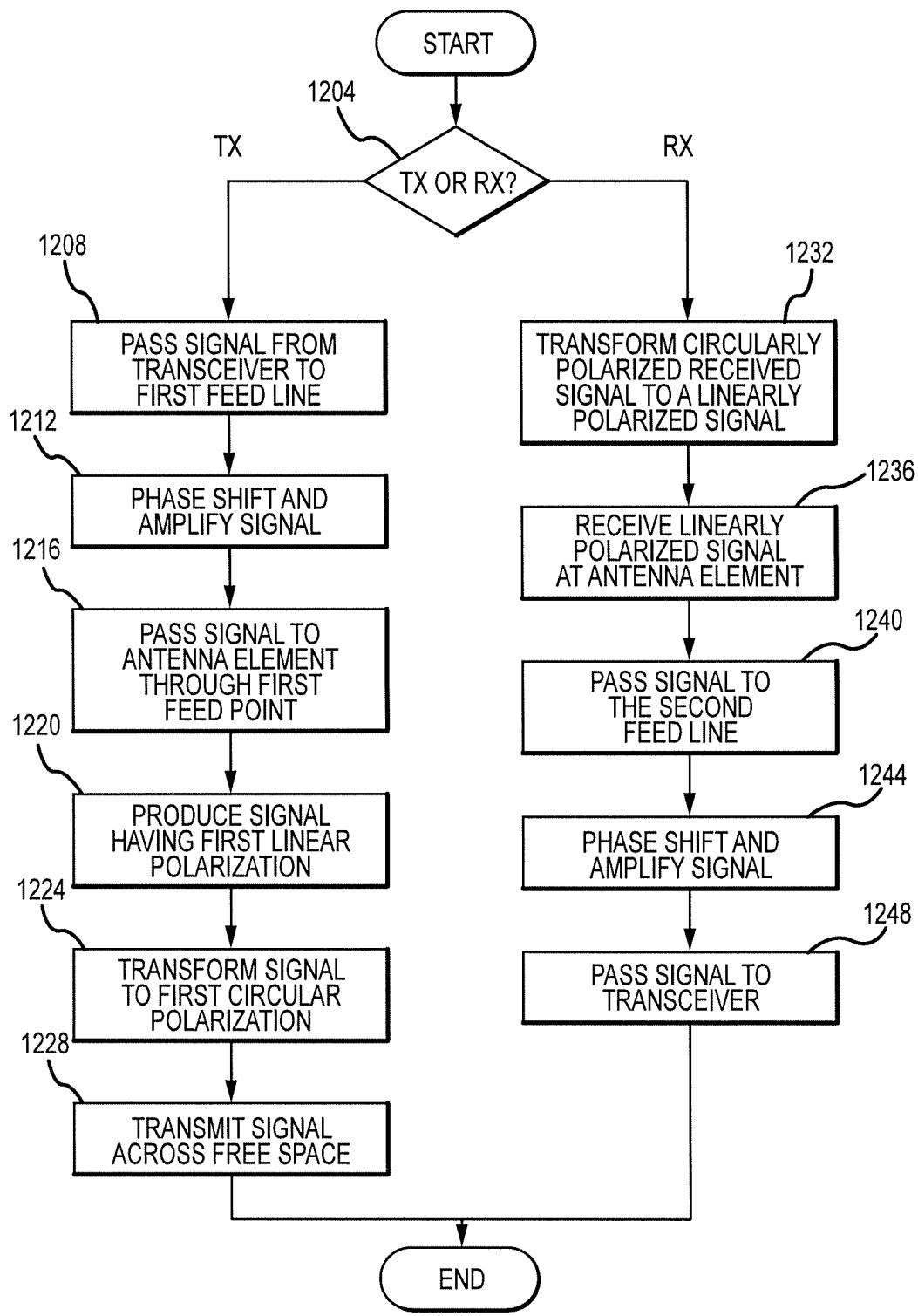
FIG. 12 is a flow chart depicting methods for providing selectively polarized signals in accordance with embodiment of the present disclosure.

FIG. 12 illustrates aspects of a method for providing selectively polarized signals in accordance with embodiments of the present disclosure. Initially, at step 1204, a determination is made as to whether a signal is being transmitted or received relative to the endpoint 104 including the antenna system 12. For a signal that is transmitted, the process proceeds to step 1208, where a radio frequency signal provided by a transceiver 28 included in the antenna system 12 and having a first radio frequency is passed along a first feed line 312. The signal can be phase shifted and amplified (step 1212). The phase shifted and amplified signal is then provided to an antenna element 24 through a first feed point 112 (step 1216). This results in the production of a signal having a first linear polarization and the first frequency (step 1220). In particular, the antenna element 24 is dimensioned such that a signal having the first frequency and that is fed to the radiating element 24 through the first feed point 112, is radiated from the antenna element 24. At step 1224, the signal having the first linear polarization and the first frequency is transformed to a signal having a first circular polarization and the first frequency by passing the linearly polarized signal through a polarizer 16. The signal is then transmitted across free space as a circularly polarized signal (step 1228). The process may then end with respect to the transmitted signal.

A signal received at the antenna system 12 from free space is transformed from a circularly polarized signal to a linearly polarized signal by passing the received signal through a polarizer 16 (step 1232). The circularly polarized signal received at the antenna system 12 may have a second circular polarization that is opposite the first circular polarization, and the linear polarization may be a second linear polarization that is orthogonal to the first linear polarization. As an example, a signal having a second circular polarization and a second radio frequency received at the antenna system 12 is transformed to a signal having a second linear polarization and the second radio frequency. The linearly polarized signal is received at an antenna element 24 (step 1236). The antenna element 24 passes the signal to the second feed line 316 via the second feed point 116 (step 1240). In particular, the antenna element 24 is dimensioned such that a signal having the second frequency, like the received signal, is passed to the second feed point 116. The signal may then be amplified and phase shifted (step 1244), and passed to the transceiver 28 (step 1248). The process with respect to the reception of a signal at the antenna system 12 can then end.

As can be appreciated by one of skill in the art after consideration of the present disclosure, an antenna element 24 can transmit and receive signals simultaneously. Moreover, in addition to being separated using opposite polarizations, transmitted and received signals can be separated by frequency. Accordingly, embodiments of the present disclosure provide separation between transmitted and received signals.

In addition, it can be appreciated that embodiments of the present disclosure provide systems and methods that can be operated as an electronically steered phased array antenna system 12. For example, an antenna system 12 can incorporate multiple antenna elements 24 associated with a polarizer 16 and phase shifters 808 to provide for the steering of beams 32 and 36 that are transmitted across free space as circularly polarized signals.

As can be appreciated by one of skill in the art, an antenna system 100 in accordance with embodiments of the disclosed invention may be incorporated into and associated with an electronic package that includes transmit and/or receive electronics. For example, where an antenna system 12 transmits at a relatively high frequency and receives at a relatively low frequency, the first port 112 of an antenna element 24 may be associated with a transmitter, while the second port 116 of the antenna element may be associated with a receiver. In addition, an antenna system 100 as illustrated may be operated in conjunction with a number of other like or similar antenna systems comprising an array of antenna elements 24. Moreover, antenna systems 12 in accordance with embodiments of the disclosed invention may be implemented as phased array antennas.

An antenna system 12 in accordance with embodiments of the disclosed invention may be constructed using known techniques. For example, various of the elements, and the associated feed networks may be implemented as strip lines formed on printed circuit board material. Other known techniques may also be utilized. Moreover, the patches or radiating elements can be square, round, rectangular, or other shapes or configurations.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. An antenna, comprising:
   a substrate;
   a planar antenna element, wherein a first side of the antenna element is disposed on the substrate;
   a first feed point at a first location on the antenna element;
   a second feed point at a second location on the antenna element, wherein the first feed point is separated from the second feed point;
   a spacer, wherein the antenna element is between the spacer and the substrate;
   a passive element, wherein the spacer is between the passive element and the antenna element; and
   a polarizer, wherein the passive element is between the polarizer and the spacer.

2. The antenna of claim 1, wherein the antenna element is a rectangular patch antenna element, and wherein the first and second feed points are located on adjacent first and second sides of the rectangular patch antenna element respectively.

3. The antenna of claim 2, wherein the first and second sides of the rectangular patch antenna element are different lengths.

4. The antenna of claim 3, wherein the first feed point is connected to a first one of a radio frequency signal transmitter and a radio frequency signal receiver, and wherein the second feed point is connected to a second one of the radio frequency signal transmitter and the radio frequency signal receiver.

5. The antenna of claim 1, wherein the antenna element is a rectangular patch antenna element.

6. The antenna of claim 1, wherein the polarizer is a meander line polarizer.

7. The antenna of claim 1, wherein the first feed point is separated from the second feed point by 90 degrees, +/−1 degree.

8. The antenna of claim 1, wherein the antenna element is disposed within a first plane, wherein its passive element is disposed within a second plane, wherein its polarizer is disposed within a third plane, and wherein the first, second, and third plane are bundled to one another.

9. A method of producing a polarized signal, comprising:
   forming a first antenna element on a substrate, wherein the first antenna element is planar;
   connecting a first feed line to the first antenna element at a first point on the first antenna element;
   connecting a second feed line to the first antenna element at a second point on the first antenna element, wherein the first point is separated from the second point;
   placing a spacer over the first antenna element;
   placing a passive element on the spacer, wherein the spacer separates the first antenna element from the passive element;
   placing a polarizer adjacent the passive element, wherein the passive element is between the polarizer and the first antenna element;
   at least one of receiving or transmitting a first signal from the first feed line, wherein the first signal is passed through the polarizer; and
   at least one of receiving or transmitting a second signal from the second feed line, wherein the second signal is passed through the polarizer.

10. The method of claim 9, wherein the polarizer is operable to transform a linearly polarized signal associated with the first feed point to a first circularly polarized signal, and to transform a linearly polarized signal associated with the second feed point to a second circularly polarized signal.

11. The method of claim 10, wherein the first circularly polarized signal is a right hand circularly polarized signal, and the second circularly polarized signal is a left hand circularly polarized signal.

12. The method of claim 9, wherein the first signal is transmitted from the first feed line, and wherein the second signal is received from the second feed line.

13. The method of claim 9, wherein the first antenna element is a rectangular patch antenna element, wherein the first feed line is connected to a shorter side of the antenna element, and wherein the second feed line is connected to a longer side of the antenna element.

14. The method of claim 13, wherein the first signal is transmitted from the first feed line, and wherein the second signal is received from the second feed line.

15. The method of claim 9, wherein the first antenna element is a rectangular patch antenna element.

16. An antenna system, comprising:
a substrate;
a plurality of antenna elements, wherein the antenna elements are planar and are adjacent the substrate;
a plurality of first feed points, wherein each antenna element in the plurality of antenna elements is associated with one first feed point;
a plurality of second feed points, wherein each antenna element in the plurality of antenna elements is associated with one second feed point, and wherein for each antenna element the first feed point is separated from the second feed point by about 90 degrees;
a spacer, wherein the antenna elements are between the spacer and the substrate;
a plurality of passive elements, wherein the spacer is between the passive elements and the antenna elements; and
a polarizer, wherein the polarizer extends so that it is adjacent the plurality of antenna elements.

17. The antenna system of claim 12, further comprising:
a plurality of phase shifters, wherein a radio frequency signal produced by the antenna system is electronically steerable.

\* \* \* \* \*